United States Patent [19]

Shadduck

[11] Patent Number: 4,572,444

[45] Date of Patent: Feb. 25, 1986

[54] FOOD CHOPPER

[76] Inventor: Laurine R. Shadduck, 6220 Byron St., Rosemont, Ill. 60018

[21] Appl. No.: 606,581

[22] Filed: May 3, 1984

[51] Int. Cl.[4] .......................... A47J 43/00; B26B 3/04

[52] U.S. Cl. ...................................... 241/168; 30/301; 30/316

[58] Field of Search ................. 30/130, 301, 315, 316; 241/168

[56] References Cited

U.S. PATENT DOCUMENTS

| | | | |
|---|---|---|---|
| 198,219 | 12/1877 | Schell, Jr. | 30/301 |
| 3,667,519 | 6/1972 | Shadduck | 30/316 X |

*Primary Examiner*—Howard N. Goldberg
*Assistant Examiner*—Timothy V. Eley
*Attorney, Agent, or Firm*—Emrich & Dithmar

[57] ABSTRACT

A food chopper having a handle and a plurality of concentric cylindrical cutting blades, each having a vertical wall and a cutting edge at the bottom thereof with flowthrough openings formed in the vertical walls with adjacent flowthrough openings being separated by relatively narrow structural struts. A first handle member closes the top of the outermost of the blades and has a plurality of flexible finger members forming a generally cylindrical area. A block member carrying at least two concentric cutting blades with a second handle member projecting from the block member is adapted to snap fit into the central cylindrical area defined by the finger members. Spring means is mounted in the block member to urge one of the concentric cutting blades outwardly so that the cutting edge thereof is normally positioned outwardly of the cutting edge of the outermost blade.

7 Claims, 6 Drawing Figures

FOOD CHOPPER

BACKGROUND OF THE INVENTION

This invention relates to kitchen utensils and more particularly to hand-operated devices for chopping or cutting various foods, such as vegetables, fruits, nuts, and the like.

Instruments for chopping or sectioning foods have heretofore been provided in a multitude of forms and operational characteristics ranging from the simplest and, perhaps, most universal, single-bladed knife to highly specialized devices of limited applicability such as, for example, a bank of taut wires for slicing hard-boiled eggs. A truly universal instrument is of course a virtual impossibility because of the great variety of problems inherent in treating the many different types of foods.

A group of foods possessing common treatment problems may be said to comprise the firm or crisp foods such as, cabbage, celery, lettuce, nuts, apples, etc. Chopping a vegetable like cabbage with a single-bladed knife is not only tedious and somewhat dangerous, but is is also objectionable because the cut or shredded segments tend to scatter undesirably over or off the cutting surface. Efforts to cope with these problems have produced devices with concentric cylindrical chopping blades, but the latter have proved wholly unsatisfactory because of the tendency of the chopped material to cling to and become impacted or wedged between the blades. This necessitated frequent use of a separate prying instrument to unclog the chopping device. Leaving the concentric blades uncovered or open at their tops (as in U.S. Pat. No. 468,893) merely simplified the job of prying loose the impacted chopped materials and also resulted in a scattering of the chopped materials from off the tops of the blades as the device was reciprocated during use. As a result, concentric-blade chopping devices have fallen into disuse despite the otherwise apparent desirability of such structures.

My prior U.S. Pat. No. 3,667,519 issued June 6, 1972 addressed some of these problems but still did not provide the versatility and ease of cleaning which is desirable. The present invention is more versatile and is easier to clean than my prior device.

SUMMARY OF THE INVENTION

It is therefore a primary object of this invention to provide an improved hand-operated food chopper with concentric blades which overcomes the shortcomings described hereinabove.

Another object of the invention is to afford an improved food chopper of the character described which is particularly adapted for chopping firm and crisp foods but which nonetheless eliminates or greatly reduces clogging.

A further object is to provide an improved food chopper of the character described which may be readily assembled and disassembled for purposes of cleaning, maintenance and replacement of parts.

Still another object is to afford an improved food chopper of the character described which is simple to use, durable, and highly efficient for the purposes intended.

With the foregoing and other objects in view, which will appear as the description proceeds, the invention comprises a food chopper having a handle and a plurality of concentric cylindrical cutting blades, the blades including a vertical wall and a cutting edge at the bottom thereof with flow through openings formed in the vertical walls of the blades with adjacent flowthrough openings being separated by relatively narrow structural struts and aggregating a substantial portion of the surface area of each of the vertical walls, the improvement comprising a first handle member closing the top of the outermost of the blades having a plurality of flexible finger members forming a generally cylindrical area, a block member carrying at least two concentric cutting blades, a second handle member projecting from the block member adapted to snap-fit into the central cylindrical area defined by the flexible finger members, and spring means mounted in the block member to urge one of the concentric cutting blades outwardly so that the cutting edge thereof is normally positioned outwardly of the cutting edge of the outermost blade, whereby the one blade automatically moves longitudinally responsive to each compression of the chopper against a resistant surface and release thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
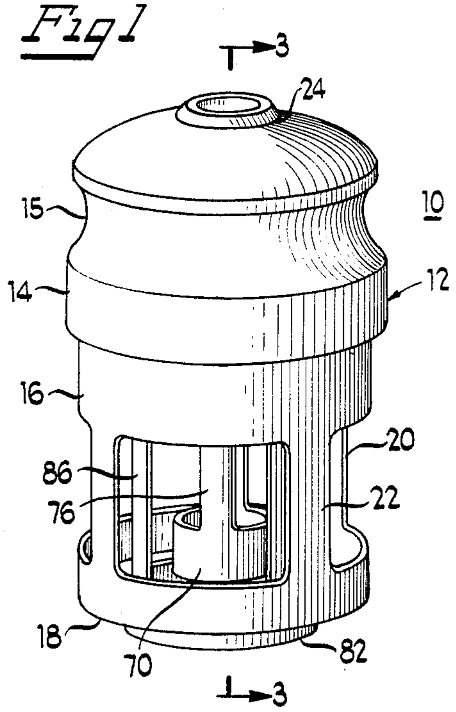
FIG. 1 is an elevational view of an improved food chopper embodying the principals of the invention.
Figure 2:
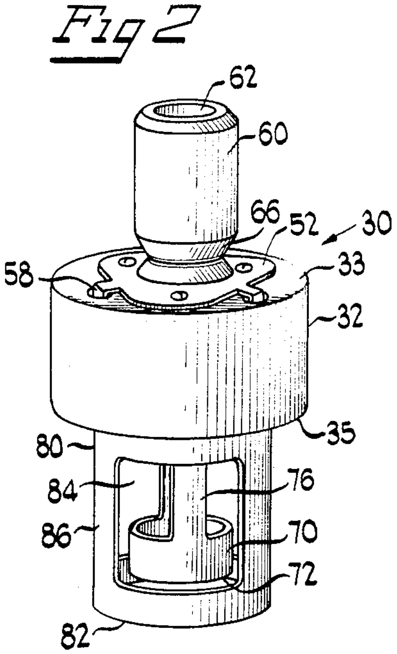
FIG. 2 is an elevational view of the subassembly which fits within the first handle.

Referring now to the drawings, a food chopper 10 embodying the principals of the invention comprises a body member 12 having a first handle portion 14 and a lower cylindrical outer blade 16 which terminates in a cutting edge 18, the first handle member 14 being provided with a circular groove 17 for fixedly receiving the blade 16 therein. The blade 16 has a plurality of flow-through openings 20 interconnected by struts 22, said openings thereby comprising in the aggregate approximately seventy to eighty percent of the blades surface area.

The body member 12 has a central cylindrical area 24 defined by a plurality of downwardly extending flexible finger members 26 each having an inwardly extending bosses 27 for a purpose hereinafter set forth.

A subassembly 30 includes a cylindrical block member 32 having an upper surface 33 and a lower surface 35 into which is cut an inner concentric groove 36 and an outer concentric groove 38. A central aperture 40 extends through the cylindrical block member 32 and is provided with internal threads 41. Three internally threaded apertures 42 are equidistantly spaced circumferentially around the cylindrical block member 32, each threaded aperture 42 extending a small distance into the cylindrical block 32 from the upper surface 33 thereof. There are three bore holes 44 extending from the upper surface 33 of the cylindrical block 32 downwardly into the block and terminating a short distance above the bottom surface or lower surface 35 thereof. The bore holes 44 are spaced 120° apart as are the holes 42 and are in radial alignment therewith. Interleaved among the three bore holes 44 are three spring-receiving holes 46 which extend downwardly from the upper surface 33 of the block 32 a shorter distance than the bore holes 44. Three coil springs 50 are housed within the appropriate spring-receiving holes 46, and it should be noted that the concentric groove 38 intersects the bore holes 42 and the spring holes 46, for a purpose hereinafter explained.

A generally triangularly shaped retaining plate 52 has a large central aperture 54 and three equidistantly spaced apart screw holes 56 to accommodate therethrough screws 57, the screw holes 56 being constructed to be alignment with the threaded apertures 42 in the block member 32. Three downwardly extending prongs 58 are integral with the retaining plate 52 and are provided with upwardly turned hook ends 59 which are dimensioned to be received within the bore holes 44. A second handle 60 extends upwardly from the cylindrical block member 32 and has a large central aperture 62 which at the bottom thereof leads to a screw hole 64 which is in alignment with the threaded aperture 41 in the cylindrical block member 32. A screw 67 serves to mount the second handle 60 to the cylindrical block member 32 while the screws 57 mount the retaining plate 52 to the block. Finally, the outer surface of the second handle 60 is provided with a circumferentially extending groove portion 66 which is complementary in shape to the bosses 27 extending inwardly from each of the finger members 26 thereby to receive the finger members therein.

Figure 3:
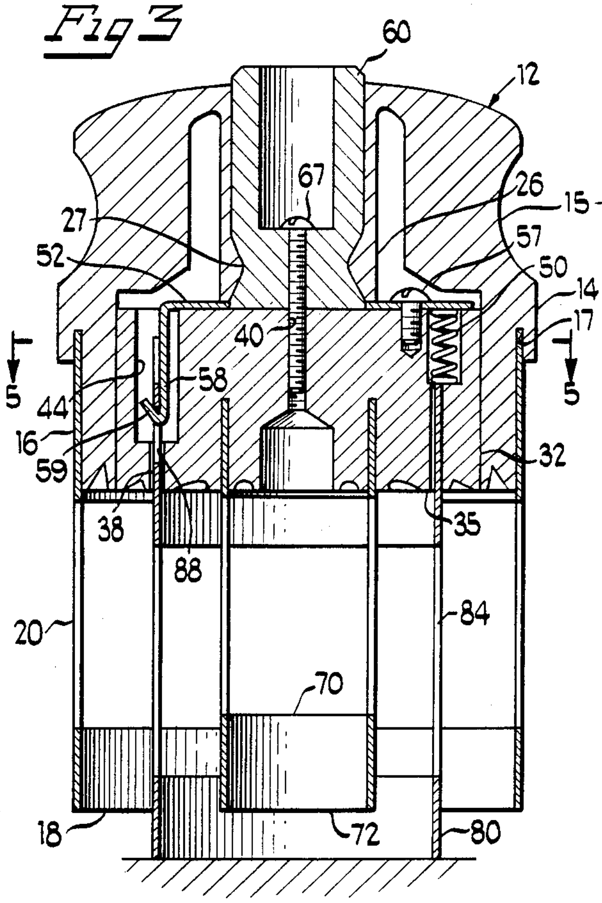
FIG. 3 is a vertical section view taken along lines 3—3 of FIG. 1 showing the blades in the normal or storage position thereof.
Figure 4:
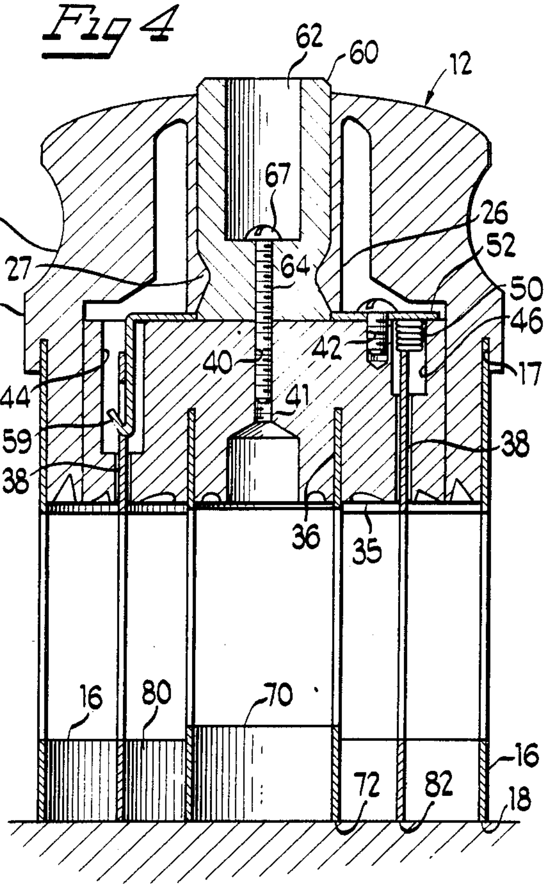
FIG. 4 is a view like FIG. 3 with the movable blade retracted.
Figure 5:
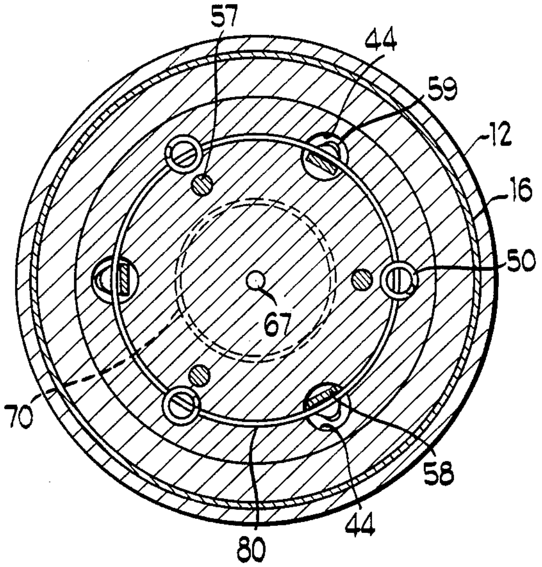
FIG. 5 is a horizontal sectional view taken along line 5—5 of FIG. 3.
Figure 6:
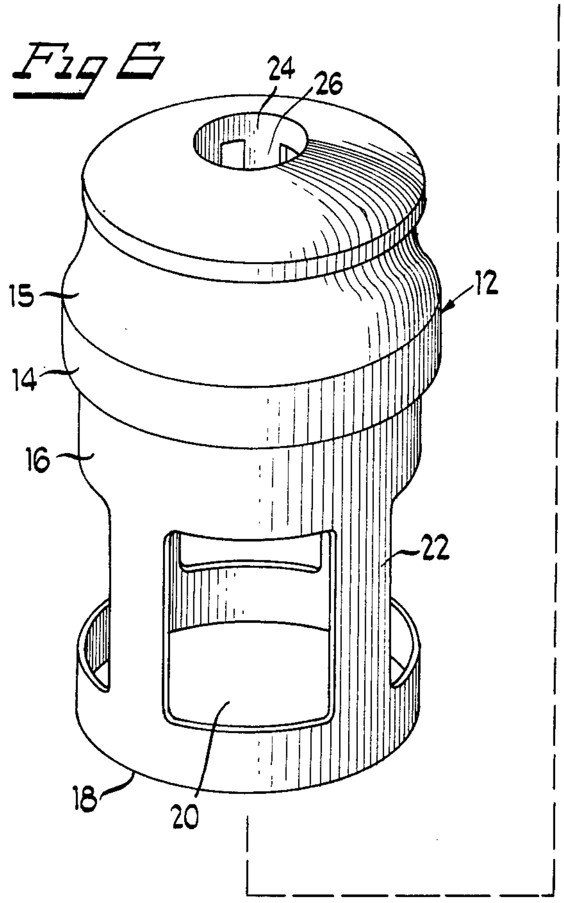
FIG. 6 is an exploded elevational view of the food chopper illustrated in FIG. 1.
Figure 6:
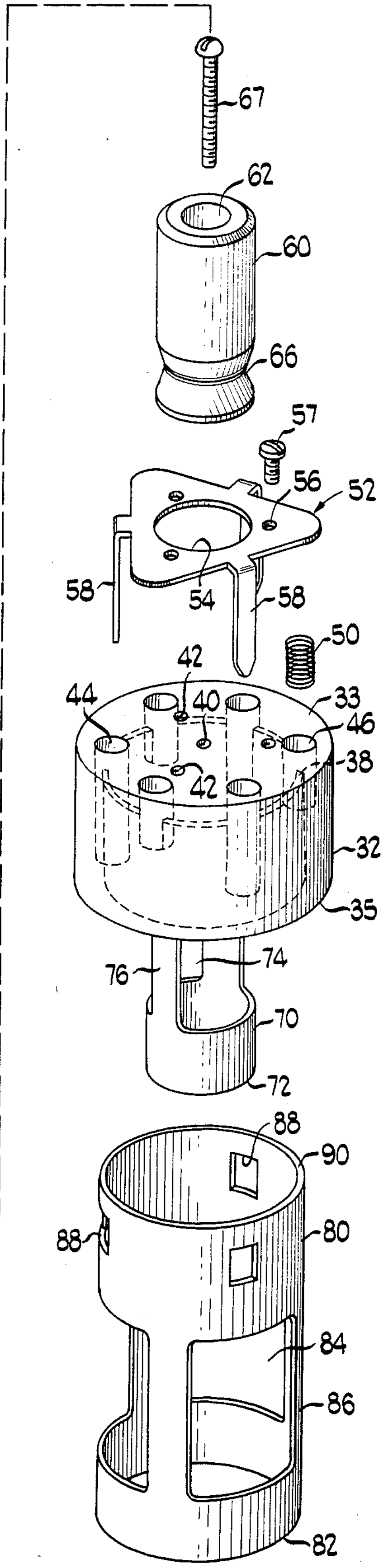

An inner cylindrical blade 70 has a cutting edge 72, a plurality of flowthrough openings 74 interrupted by struts 76, the flowthrough openings 74 comprising in the aggregate approximately seventy to eighty percent of the blade surface area. The blade 70 is fixedly mounted within the groove 36 by any means well known in the art. A middle blade 80 has a cutting edge 82, a plurality of flowthrough openings 84 interrupted by struts 86 and three circumferentially equidistantly spaced slots 88. The blade 80, like the other blades, have the openings 84 comprising approximately seventy to eighty percent blade surface area. The blade 80 is mounted to the block member 32 by means of the hook portions 59 of the downwardly extending prongs 58 from the retaining plate 52, the hook portions 59 extending through the slots 88 in the blade 80. It should also be noted that the top end surface 90 of the blade 80 butts against the springs 50 which thereby cause the blade 80 normally to be biased to the outward position shown in FIG. 3, the blade 80 being retained within the block member 32 by means of the hook portions 59 of the retaining plate 52. As seen from FIG. 4, the blade 80 is movable to a position wherein all the cutting edges of the three blades, these being cutting edges 18, 72 and 82 lie in the same plane when forces are applied against the cutting edge 82 of the plate 80, thereby causing the springs 50 to be compressed to the position shown in FIG. 4.

When the chopper 10 is applied to a food to be chopped such as a wedge of cabbage, stalk of celery, or the like, the springs 50 are compressed until the three cutting edges 18, 72 and 82 are in the same horizontal plane. Due to the very large areas afforded by the flowthrough openings 20, 74 and 84, the cut or chopped food material tends to flow through these openings instead of becoming lodged between the blades. At the same time, the subassembly 30 may be easily released from the body member 12 by simply pushing on the top surface of the second handle 60, thereby causing the resilient or flexible members 26 to move outwardly, allowing the subassembly 30 to be easily removed and used as desired. The subassembly 30 is also useful for chopping operations in limited spaces or areas, while the body member 12 having the fixed blade 16 therein is also useful by itself.

Another advantage of this invention is the ease of cleaning as well as the plurality of operations facilitated by the removal of the subassembly 30 from the combination food chopper 10. The cooperation of the subassembly 30 with the fixed outermost blade 16 and handle 14 therefor is a distinct improvement over the prior art.

While there has been described what at present is considered to be the preferred embodiment of the present invention, it will be appreciated that various alterations and modifications may be made therein without departing from the true scope and spirit of the invention which is intended to cover by the claims appended hereto.

What is claimed is:

1. In a food chopper having a handle and a plurality of concentric cylindrical cutting blades, each of said blades including a vertical wall and a cutting edge at the bottom thereof with flowthrough openings formed in the vertical walls of said blades with adjacent flowthrough openings being separated by relatively narrow structural struts and aggregating a substantial portion of the surface area of each of the vertical walls, the improvement comprising: a first handle member closing the top of the outermost of said blades having a plurality of flexible finger members forming a generally cylindrical area; a block member carrying at least two concentric cutting blades; a second handle member projecting from said block member adapted to snap fit into the central cylindrical area defined by said finger members; spring means mounted in said block member to urge one of said concentric cutting blades outwardly so that the cutting edge thereof is normally positioned outwardly of the cutting edge of the outermost blade; and a retainer member mounted to the top of said block member for retaining one of said concentric cutting blades within said block member and for retaining said spring means within said block, whereby said one blade automatically moves longitudinally repsonsive to each compression of the copper against a resistive surface and release thereof.

2. The food chopper of claim 1, wherein the outermost blade is fixedly mounted in said first handle member.

3. The food chopper of claim 1, wherein said first handle has a circular indentation in the outer surface thereof to facilitate easy handling of the chopper.

4. The food chopper of claim 1, wherein there are three flexible finger members having a portion thereof shaped complementary to a portion of said second handle member.

5. The food chopper of claim 1, wherein said block member has two concentric grooves constructed and arranged to accept blades therein in the bottom surface thereof.

6. The food chopper of claim 5, wherein said outer concentric groove provides contact between said one concentric cutting blade and said spring means is three coil springs equiangularly spaced within said block.

7. The food chopper of claim 6, wherein said retainer member has three downwardly extending prongs having hook ends thereon, said one concentric blade having three slots therein for receiving said hook members.

* * * * *

UNITED STATES PATENT AND TRADEMARK OFFICE

CERTIFICATE OF CORRECTION

PATENT NO. : 4,572,444

DATED : February 25, 1986

INVENTOR(S) : Laurine R. Shadduck

It is certified that error appears in the above—identified patent and that said Letters Patent is hereby corrected as shown below:

Claim 1, column 4, line 63 "repsonsive" should be --responsive--.

Claim 1, column 4, line 64, "copper" should be --chopper--.

Signed and Sealed this

*Twenty-second* Day of *July 1986*

[SEAL]

*Attest:*

DONALD J. QUIGG

*Attesting Officer* *Commissioner of Patents and Trademarks*